(12) United States Patent
Hudson et al.

(10) Patent No.: US 7,177,371 B1
(45) Date of Patent: Feb. 13, 2007

(54) METHODS AND APPARATUS FOR TRANSMITTING AND RECEIVING DATA OVER A COMMUNICATIONS NETWORK IN THE PRESENCE OF INTERFERENCE

(75) Inventors: John E. Hudson, Stansted (GB); David G. Steer, Nepean (CA); Bassam M. Hashem, Nepean (CA); Daniel Boudreau, Hull (CA); Koon Hoo Teo, Nepean (CA)

(73) Assignee: Nortel Networks Ltd., St. Laurent (CA)

( * ) Notice: Subject to any disclaimer, the term of this patent is extended or adjusted under 35 U.S.C. 154(b) by 769 days.

(21) Appl. No.: 10/131,911

(22) Filed: Apr. 25, 2002

Related U.S. Application Data

(63) Continuation-in-part of application No. 10/032,419, filed on Dec. 21, 2001.

(51) Int. Cl.
*H04L 27/20* (2006.01)
*H04L 27/36* (2006.01)

(52) U.S. Cl. .................. 375/308; 375/295; 375/298

(58) Field of Classification Search .......... 375/308, 375/295, 298
See application file for complete search history.

(56) References Cited

U.S. PATENT DOCUMENTS 4,039,961 A * 8/1977 Ishio et al. .............. 329/308

6,374,117 B1 * 4/2002 Denkert et al. .......... 455/522
6,404,755 B1 * 6/2002 Schafer .................... 370/338
6,823,005 B1 * 11/2004 Chuang et al. .......... 375/227
2003/0021243 A1 * 1/2003 Hamalainen ............. 370/329

OTHER PUBLICATIONS

Papke, "Combined Multilevel Turbo-code with MR—Modulation", Proceedings of the Conference on Communications, Jun. 18, 1995, pp. 668-672.

* cited by examiner

Primary Examiner—Temesghen Ghebretinsae
Assistant Examiner—Juan Alberto Torres
(74) Attorney, Agent, or Firm—Barnes & Thornburg LLP.

(57) ABSTRACT

It is becoming increasingly important to improve data throughput in wireless networks. By transmitting data simultaneously at different modulation amplitudes and/or using different code strengths, terminals having different carrier to noise ratios are able to decode the different amplitude levels with varying degrees of success. This allows distant terminals to receive low data rate transmissions at high modulation levels or code rates while nearer terminals can use additional capacity in the transmission by receiving lower level modulation signals or code rates. In this way, distant terminals do not degrade overall network performance. By arranging for terminals to acknowledge receipt of data, retransmission at different modulation levels or code rates may be carried out by the base station in order to improve performance in the presence of noise without a priori knowledge of the carrier to noise ratio for a particular terminal.

33 Claims, 7 Drawing Sheets

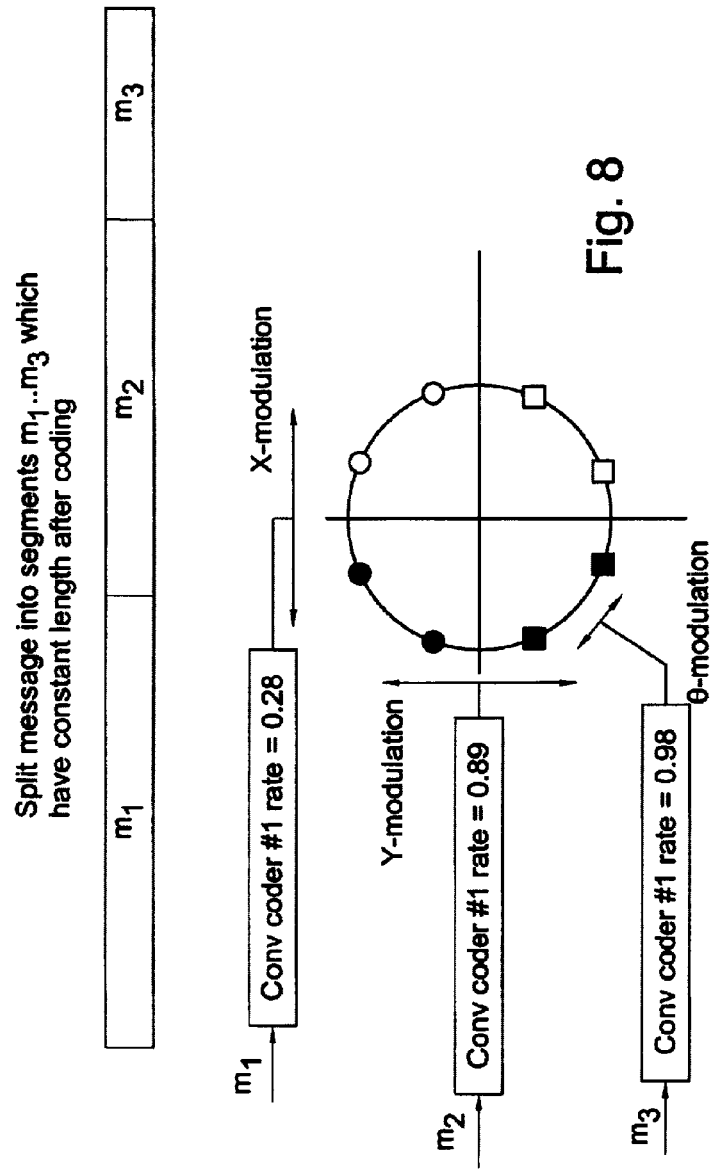

METHODS AND APPARATUS FOR TRANSMITTING AND RECEIVING DATA OVER A COMMUNICATIONS NETWORK IN THE PRESENCE OF INTERFERENCE

CROSS-REFERENCE TO RELATED APPLICATION

This is a Continuation-in-part application of U.S. application Ser. No. 10/032,419 filed on 21 Dec. 2001.

FIELD OF THE INVENTION

This invention relates to methods of transmitting and receiving data over a communications network to a modulator and a demodulator, and to a transmitter.

BACKGROUND OF THE INVENTION

Currently and no doubt in the future, considerable effort is being put into converting existing cellular mobile networks and designing future cellular mobile networks for high-capacity data transmission. Such data transmissions are required, for example, not only to service mobile terminals (for example to allow Internet access for laptop and PDA users) but also to provide broadband Internet access over a wireless local loop. As such, the data rates in such networks are considerably higher than had previously been required simply to transmit voice data.

Accordingly, maximised utilisation of base stations and spectrum in terms of data throughput in the network from the base stations to the terminals is an important goal in any new network design.

One approach which has been proposed by QUALCOMM (a registered trademark, hereinafter RTM) is so-called high data rate (HDR) technology. This technology takes advantage of the bursty nature of data transmissions by allocating each class of user (registered with a particular base station) a fractional time on any one channel. Within predetermined latency constraints (i.e. predetermined maximum times to transmit a predetermined number of bits to a terminal) the fractional time of a channel may be varied to dynamically alter the average data throughput to a particular terminal. This allows the network to provide high data rates for a terminal which instantaneously require high data rates and to reallocate that high data rate to another terminal when it is no longer required by the first terminal.

Although this approach is effective to at least some extent, one significant disadvantage of this technique is that network throughput is compromised by any terminal which is unable to receive data at high coding rates (for example because it has a poor carrier to noise ratio due to its distance from the base station and/or due to poor propagation characteristics in the radio channel between the base station and terminal). Thus if the terminal having a poor carrier to signal ratio requires a relatively large volume of data, a significant portion of the fractional time of a channel will be allocated to that terminal which will degrade the performance of other terminals.

SUMMARY OF THE INVENTION

In accordance with a first aspect of the invention there is provided a method of transmitting data over a radio communications network comprising dividing the data into a plurality of distinct data streams, modulating each data stream into a single radio signal at different respective modulation levels, and transmitting the radio signal.

As is explained in more detail below, by modulating several different data streams (for example using QPSK modulation for each data stream) and simultaneously transmitting the data streams, terminals close to the base station are able to receive the signals modulated at lower amplitude and terminals having lower carrier to noise ratios (typically at further distances from the base station) are only able to demodulate the data streams modulated at high amplitude. In this way, rather than network throughput being compromised through terminals having differing carrier to noise signal ratios, this difference is turned to the networks advantage by allowing it to distinguish between different terminals.

As explained in more detail below, if each modulation level is applied as QPSK modulation at differing power levels (for example, reducing by half at each subsequent modulation) 64 QAM (quadrature amplitude modulation) modulation is produced.

In a second aspect, the invention provides a method of receiving data over a radio communications network, comprising receiving a radio signal carrying a plurality of data streams modulated at different respective modulation levels, and demodulating a first data stream from the signal, and attempting to demodulate at least one further data stream from the signal.

Thus each terminal attempts to demodulate as much of the signal as it can. This means that terminals having better carrier noise ratios are able to receive higher rate data.

In the example mentioned above of a plurality of overlapping QPSK modulations at differing amplitudes, a terminal may for example treat two overlapped QPSK modulations as a composite 16 QAM signal (depending on how it has been modulated at the transmitter). Thus depending on choices made at the base station, the different modulation levels may be used to direct different data streams to terminals in different zones (as defined by their respect carrier to noise ratios and therefore ability to demodulate the different amplitude levels of the transmitted signal) or to aggregate the different modulation levels to produce a composite signal of higher data rate.

Thus for example, a terminal near the base station is likely to be able to demodulate all levels of the transmitted signal. By choosing to provide data for that terminal on all levels, the data bandwidth for that terminal is maximised. Optionally, some of the higher levels amplitude levels may carry data destined for more distant terminals in which case the data throughput is shared between the near and far terminals. This is in contrast to the QUALCOMM (RTM) HDR solution in which a choice would need to be made between transmitting data at relatively low rates to the far terminal or at high rates to the near terminal.

As a further enhancement, a terminal may indicate that it has not received data. This may be achieved for example by the base station waiting for a predetermined time for acknowledgement of data which it has transmitted or by a terminal requesting retransmission of data which it has been unable to decode accurately. In this way, a base station may choose how to retransmit data. For example, it may choose to retransmit the data at the same amplitude modulation level or at a greater modulation level. It may also choose to increase the strength of any forward error correction which is applied prior to transmission. Furthermore, the base station may use repetition codes of gradually increasing strength in order to ensure that eventually the terminal receives the data. Thus, the base station may adapt to the instantaneous carrier to noise levels experienced by the terminal and does not need a priori knowledge of the carrier to noise ratio (for example by receiving measurements taken by the terminal). This overcomes a problem particularly with 3G networks in which interference is bursty in nature (typically as a result of neighbouring terminals transmitting and receiving bursty data). Thus instantaneous measurements of carrier to noise ratio of the terminal do not provide an effective indicator of the needs of the terminals since the base station may not be able to use the measurements for several milliseconds (because it will be transmitting to other terminals) by which time the carrier to noise measurement is likely to be out of date.

In accordance with another aspect of the invention there is provided a data-bearing radio signal comprising a plurality of QPSK modulated data streams combined into a single QAM transmission, the combination being made by combining each QPSK signal at progressively smaller amplitude levels.

In a further aspect there is provided a modulator for a radio signal comprising a plurality of data inputs arranged to receive respective data streams, a modulator for applying modulation to a radio signal responsive to data received at each of the data inputs, the modulator being arranged to apply modulation at different respective amplitude levels for data received at respective data inputs.

The invention may also provide a radio transmitter having a plurality of data inputs arranged to receive respective data streams, and a modulator for applying modulation to a radio signal responsive to data received at each of the data inputs, the modulator being arranged to apply modulation at different respective amplitude levels for data received at respective data inputs.

In another aspect, the invention provides a demodulator arranged to demodulate a radio signal having a plurality of data streams modulated at different respective modulation levels.

In a further method aspect, the invention provides a method of transmitting data over a radio network to a plurality of terminals comprising modulating a signal for transmission with a plurality of respective data streams, selecting the modulation amplitude for each data stream according to the desired destination of each respective data stream, and simultaneously transmitting the data streams, whereby the data is simultaneously transmitted to selected terminals by virtue of their differing radio channel properties and distances from the transmitter.

In a further aspect, the invention provides a method of transmitting data over a communications network comprising prioritising data for transmission according to its sensitivity to delay, and any impending deadline for receipt at a network terminal, dividing the data into a plurality of distinct data streams, modulating each data stream into a single transmission signal at different respective modulation levels, and transmitting the signal.

In this way, for example, a terminal requiring delay sensitive data such as that required for Digital Video Broadcast (DVB) or Digital Audio Broadcast (DAB) transmissions, which has a poor carrier to interference (C/I) figure need not cause all other terminals to cease reception since those with a better C/I figure can simultaneously successfully receive data at lower modulation levels.

In another aspect, the invention provides a method of transmitting data over a network channel comprising providing a plurality of different modulation schemes which have differing robustness in the presence of channel interference, selecting one of the modulation schemes for a portion of data destined for a particular network terminal, transmitting the portion of data, keeping a record of acknowledgements or retransmission requests from the particular terminal for the portion of data and subsequent portions destined for the particular terminal, and periodically revising the modulation scheme used for data transmissions to the particular terminal based at least on the record of acknowledgements or retransmission requests.

In this way, the selection of a suitable modulation scheme or level can be made without requiring explicit C/I information. Instead, the channel quality may be inferred from information about successful reception of data, for example, using a Layer 2 (L2) acknowledgment (ARQ) received via a 3G Radio Network Controller (RNC) or a hybrid ARQ received from a base station (BS). This relieves a potential bottleneck in the uplink channels which would be caused by many terminals periodically transmitting explicit C/I information. The same inference may be made in other networks (wireless or otherwise) from retransmission requests which effectively indicate a transmission failure (the absence of which can be interpreted as a transmission success.

Accordingly, in a further apparatus aspect, the invention provides an encoder for modulating data for transmission over a network channel comprising a modulator operable to modulate data using one of a plurality of different modulation schemes which have differing robustness in the presence of channel interference, a modulation controller arranged to select one of the modulation schemes and to cause the modulator to use that modulation scheme for a portion of data destined for a particular network terminal, an output for outputting modulated data portions for transmission, a transmission database arranged to keep a record of acknowledgements or retransmission requests from the particular terminal for the portion of data once transmitted and for subsequent portions destined for the particular terminal, the modulation controller being further arranged to periodically revise the modulation scheme used for data transmissions to the particular terminal based at least on the record of acknowledgements.

Other aspects and features of the present invention will become apparent to those ordinarily skilled in the art upon review of the following description of specific embodiments of the invention in conjunction with the accompany figures.

BRIEF DESCRIPTION OF THE DRAWINGS

FIG. 8 is a schematic diagram showing an encoding scheme in accordance with the invention;

DETAILED DESCRIPTION OF THE INVENTION

Figure 1:
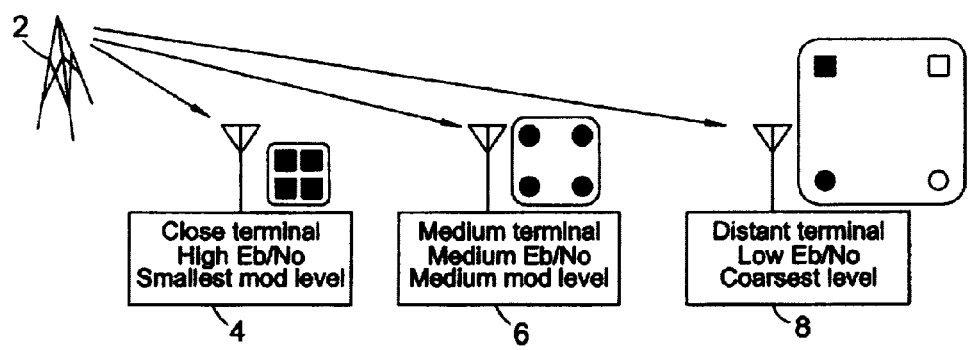
FIG. 1 is a schematic diagram of a base station and different modulation levels.

With reference to FIG. 1, a base station 2 (for example a 3G base station sending data packets) is arranged to transmit data to a plurality of terminals 4, 6 and 8 which are located at respectively increasing distances from the base station 2.

As a result of the differing distances between the respective terminals 4, 6 and 8 and the base station 2, the terminals experience different carrier to noise (Eb/No) ratios. Thus the closest terminal 4 (having the highest Eb/No) is able to demodulate signals which have been transmitted at lower amplitude by the base station 2 than the more distant terminals 6 or 8.

Thus as will be described in more detail below, the base station is arranged to transmit a signal which is modulated at several different amplitude levels. The highest amplitude modulation may for example, be the only modulation which the distant terminal 8 is able to demodulate, whereas the close terminal 4 is likely to be able to demodulate all modulation levels.

Figure 2:
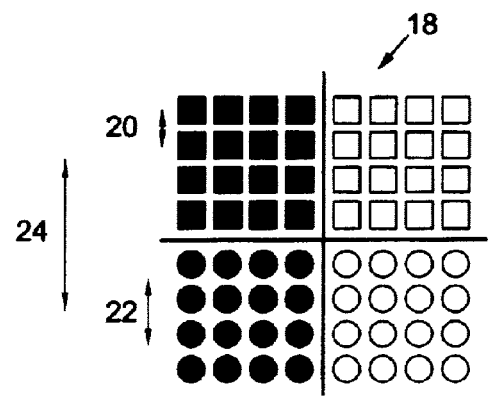
FIG. 2 shows a three level QPSK modulation scheme.
Figure 3:
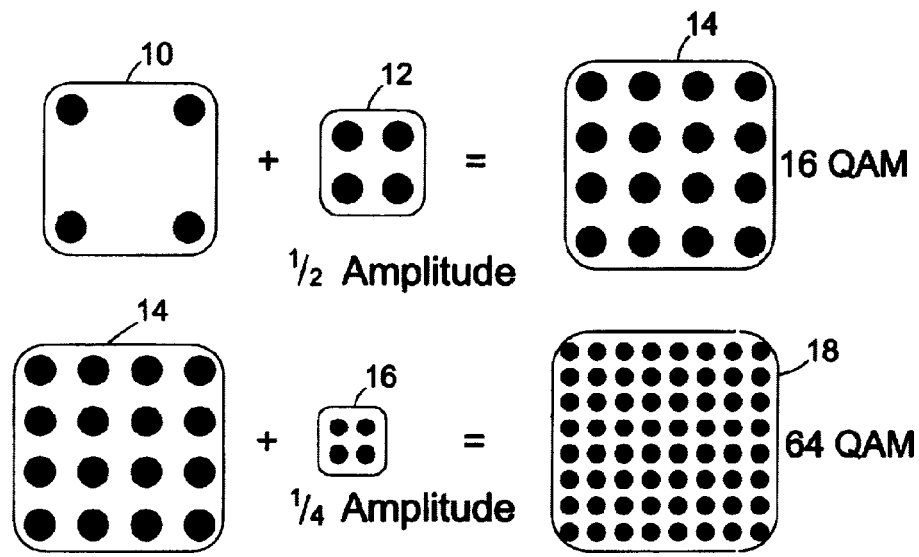
FIG. 3 shows the detailed construction of the modulation scheme of FIG. 2.

With reference to FIGS. 2 and 3, a possible modulation scheme is shown. A fundamental "layer 1" QPSK constellation 10, of unit amplitude is added to a layer 2 half amplitude QPSK constellation 12 with independent modulation. This produces a final constellation 14 which is 16 QAM.

Assuming that the two QPSK constellations 10 and 12 are orthogonal in a statistical sense since their modulations are uncorrelated, the variance of the 16 QAM modulation is equal to the sum of the variance of the two QPSK variants; namely 1+¼=1¼. Thus the 16 QAM modulation is 0.969 dB stronger than the unit amplitude QPSK 10.

The modulation may be carried to additional levels. For example, a further quarter amplitude QPSK signal 16 may be added to the 16 QAM signal to produce a three layer 64 QAM constellation 18. Similarly, if the QPSK signal 16 is uncorrelated with the other QPSK signals 10 and 12, the carrier power of the triple combination 18 is 1+¼+¹⁄₁₆=1⁵⁄₁₆ or 1.181 dB. Thus the inclusion of additional information in the signal adds a relatively small amount to the carrier power requirements.

The resultant 64 QAM constellation 18 is shown in FIG. 2 with the respective amplitude modulations for the constellations 16, 12 and 10 shown by arrows 20, 22 and 24. As will be seen, the length of the arrows schematically represents the amplitude level of each of the respective modulations.

Figure 4:
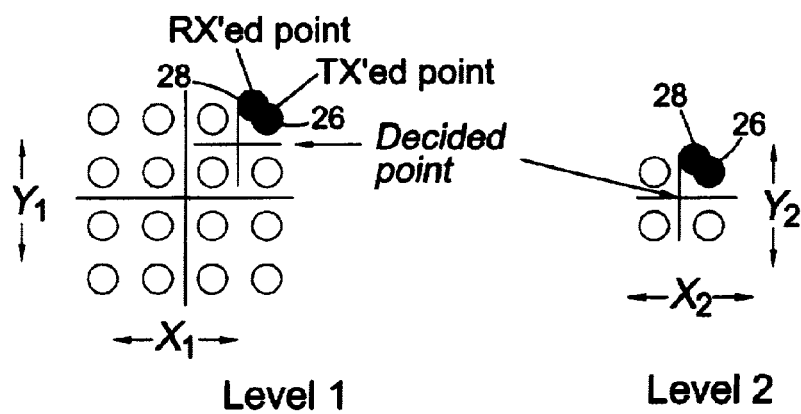
FIG. 4 is a schematic diagram indicating a demodulation technique for the modulation of FIGS. 2 and 3.

With reference now to FIG. 4, a technique for decoding the modulation shown in FIGS. 2 and 3 is now described.

At each terminal 4, 6 and 8, the same decoding procedure may be carried out. However, as will be described below, in view of the different Eb/No figures at the different terminals, not all terminals will be able to decode all levels of the modulation.

The process starts by treating the received signal (16 QAM for this example) as a simple QPSK signal. A polarity check is performed in the X and Y directions as shown in the left part of FIG. 4. As shown schematically, the transmitted point in the constellation 26 is actually received at point 28 due to noise. However, this is successfully demodulated as $X_1=+1$, $Y_1=+1$.

It is now necessary to determine which constellation point was transmitted within the second level modulation. Thus in a second stage, the ideal decided constellation point (+1, +1) at the level 1 modulation is subtracted from the received sample to produce a QPSK constellation as shown in the right side of FIG. 4. A further polarity check is then carried out on the residue to determine the second level of data which ideally is $X_2=+\frac{1}{2}$, $Y_2=+\frac{1}{2}$.

For third and subsequent modulation levels, the process is repeated so that for a third level, the ideal decided constellation point for both the preceding levels is subtracted from the received signal and a further polarity check carried out to determine the third level modulation. However, as will be noted from FIG. 4, noise has caused the receive point 28 to move from its ideal position as transmitted. Thus as the terminals 4, 6 and 8 receive the signal in the presence of increased noise (for example at further distance from the base station 2) it becomes increasingly difficult to decode the additional levels of modulation. Eventually, at further levels of modulation or at further distance from the base station, it will become impossible to decode one or more levels of modulation. Thus a graceful degradation in signal reception (and therefore bandwidth) occurs with decreasing Eb/No.

It is expected that forward error correction will be required. This is because the first level decision process is corrupted due to the presence of second and higher modulations because the minimum distance properties of any forward error (FEC) coding is "damaged". In the example given above, the potential interference power from this source is $(\frac{1}{2})^2+(\frac{1}{2})^4+(\frac{1}{2})^8+$(any subsequent modulation levels) which equals 0.33 recurring. This is only 5 dB lower than the power of the fundamental QPSK signal. Thus it will be typically be necessary to use a coding technique which is capable of operating below a carrier to noise ratio level of 5 dB.

Figure 5:
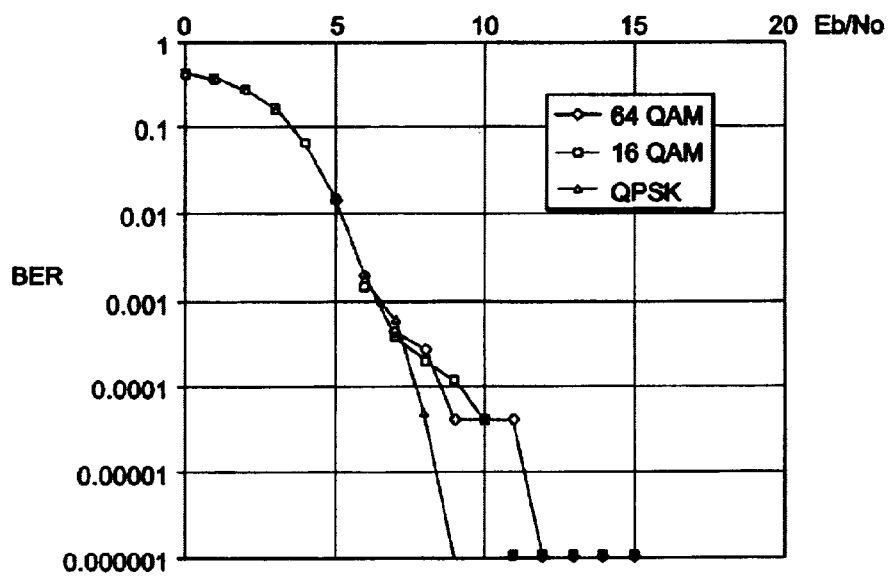
FIG. 5 is a plot of bit error rate for the combined modulation of FIGS. 2 and 3.

FIG. 5 shows how this works in practice. Three plots are shown. The plots are for basic QPSK, of 16 QAM and 64 QAM respectively. In each case, the signal has been decoded only at the unit amplitude QPSK level (i.e. the first level). Thus it can be seen that the addition of the extra levels makes negligible difference to the bit error rate. This example was produced using a half rate turbo decoder with a constraint length of 6.

Figure 6:
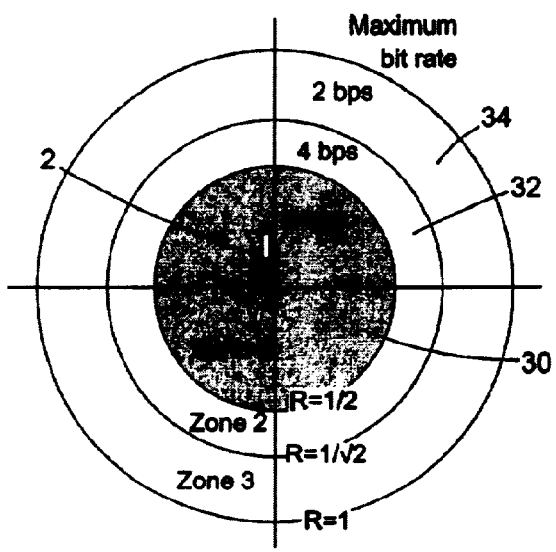
FIG. 6 is a schematic diagram showing differing data rates for different terminal zones.

FIG. 6 shows the potential effects of using such a modulation technique.

In the figure, an $R^{-4}$ propagation law has been assumed which is typical for a cellular radio base station. Thus transmitting the three layers of QPSK with carrier powers of 0, −6 and −12 dB and using similar strength FEC error correction on the three modulation levels, they will achieve a given BER at Eb/No levels differenced by 6 dB. Thus in a cellular system with an $R^{-4}$ propagation law, the ratio of radii at which the Eb/No will differ by 6 dB is $\sqrt{2}$. Thus FIG. 6 shows the annuli in which the various layers will operate with differing bits per symbol. 64 QAM (6 bits/per symbol) can be operated in the centre zone 30 and 16 QAM can be operated in the intermediate zone 32 with a parallel third level of modulation still functional in the centre zone 30. In the outer zone 34, only QPSK (two bits/per symbol) can be used but the layer two modulation can be used in the intermediate zone 4 and both the higher layers can be decoded in the central zone 30. Thus there is considerable flexibility in the allocation of bit rate to zones.

For example, the maximum possible capacity may be used in the intermediate zone 32. In this case, the intermediate zone 32 may receive a maximum of four bits per symbol (using the level 1 and 2 modulations shown in FIG.

3 as QPSK modulations 10 and 12) which provide a combination of four bits per symbol. At the same time, the inner zone 30 may receive level three QPSK at two bits per symbol.

In a second scenario, the maximum bit rate may be provided to the central zone 30. In this case, all three QPSK levels are decoded in the central zone providing a maximum bit rate of six bits per symbol.

A third scenario is simply to allocate the highest modulation QPSK (level one) to the outer zone 34, the next level modulation to the intermediate zone 32 and the lowest level modulation (reference 16 in FIG. 3) to the inner zone 30. In this case, all zones receive data at two bits per symbol. However, it will be appreciated that the areas of the zones are not equal (and in the example shown in FIG. 6, the areas are in the ratios ¼, ¼, and ½ moving out from the centre). Thus considered in per unit area terms, subscribers in the outer zone 34 receive only half the bit rates of those in the inner and intermediate zones 30 and 32.

The choice between the scenarios may be made at the design stage or may be made dynamically by the base station in response to the instantaneous bandwidth requirements of the terminals.

It will be particularly appreciated by those skilled in the art that the presence of distant terminals having low Eb/No does not prevent terminals having higher Eb/No using additional capacity in the radio network. This is shown, for example, in scenario two in which a terminal in the intermediate zone 32 is able to receive its maximum possible data rate of four bits per second without preventing a terminal in the central zone 30 from receiving the additional two bits per symbol capacity present in the radio network.

Figure 7:
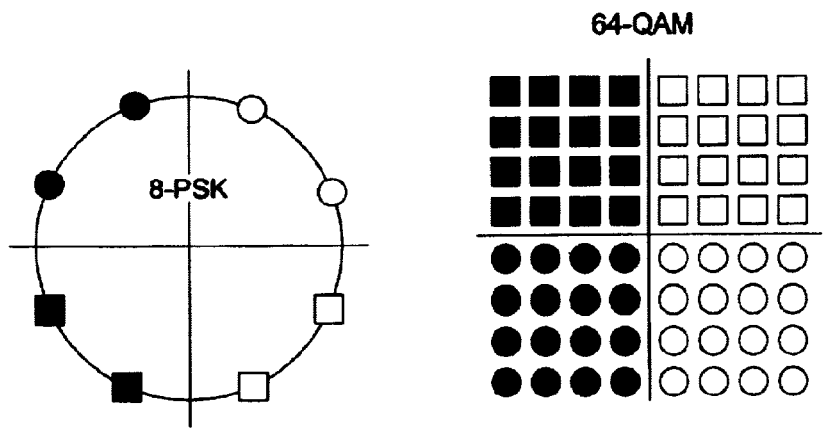
FIG. 7 is a schematic diagram showing modulation in accordance with the invention.

FIGS. 7 and 8 show schematically a possible coding scheme. An 8-PSK phase diagram is shown on the left of FIG. 7. With particular reference to FIG. 8, an incoming data stream may be split into message segments $m_1$, $m_2$ and $m_3$. These are coded at different rates and the length of the precoded segments are chosen to provide constant length after coding. Thus as shown, message segment $m_1$ is coded at a rate of 0.28, message segment $m_2$ is coded at a rate of 0.89 and message segment $m_3$ is coded at a rate of 0.98. These modulations are applied respectively as X modulation, Y modulation and angular modulation $\theta$. The different code rates provide different error protections for the data which is equivalent to the different amplitude modulation levels of the previous example.

Figure 9:
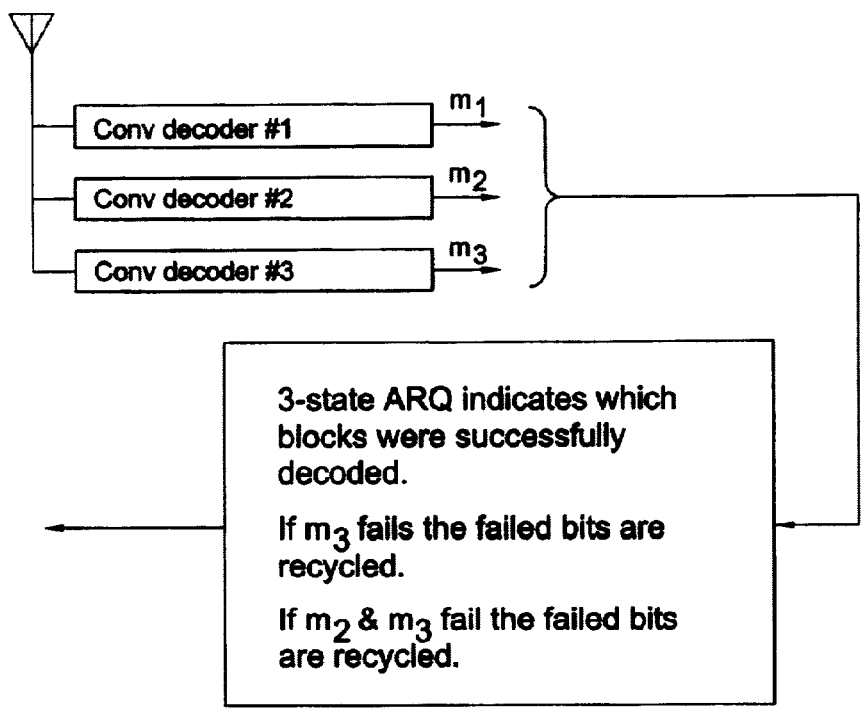
FIG. 9 is a schematic diagram showing a decoding scheme in accordance with the invention.

At the terminal, the terminal is arranged to acknowledge receipt of data once successfully decoded. Thus with reference to FIG. 9, each terminal carries out convolutional decoding of the three differently coded blocks and acknowledges blocks which were successfully decoded. If, for example, the message segment 3 (transmitted at the highest code rate) is not decoded then the transmitter recycles the failed bits and re-transmits them. Similarly, if message segments 2 and 3 are not successfully decoded then a retransmission request is issued to the base station.

The base station may choose to re-transmit the recycled bits using the same coding strength as the original transmission. Alternatively, the base station may take steps to ensure that there is a better chance of accurate reception by the terminal. This may, for example, be to re-transmit the data at a higher code rate within the multi-level structure described above. A combination of these techniques may be applied so that re-transmission requests may be used with either or both a differential code strength scheme or a differential modulation scheme. For example, the coding strength may only be increased when the base station is already transmitting the signal at the highest modulation level (i.e. the unity amplitude QPSK level 10 or FIG. 3).

Figure 10:
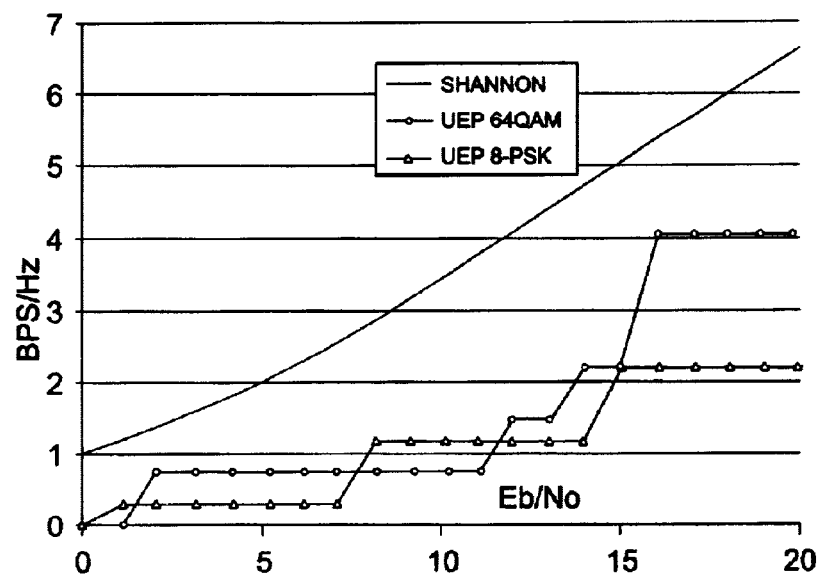
FIG. 10 shows performance of transmissions in accordance with the invention against the ideal Shannon law maximised data rate.

Finally, FIG. 10 shows the performance of multi-level modulation and different code strengths with re-transmission requests using 64 QAM and 8-PSK modulation. This performance is compared against the theoretical Shannon limit of data throughput in the presence of noise. The performance of such systems is generally within 3 dB of the theoretical Shannon limit.

As a further enhancement to the idea of varying the modulation level depending on the receipt of acknowledgements, there is now described a technique for explicitly varying the modulation level based on the receipt of acknowledgements or re-transmission requests in order to achieve a generally consistent error rate (for example a block error rate). The technique described below may be used with the multi-level QPSK modulation scheme above or indeed with any set of modulation schemes which provide varying degrees of robustness (i.e. transmission and demodulation success at a terminal) in the presence of channel interference or noise.

Figure 11:
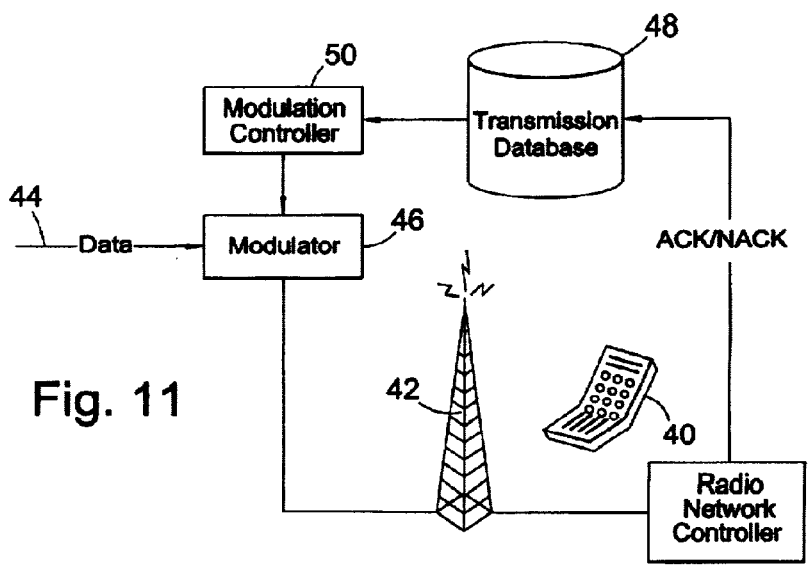
FIG. 11 is a schematic block diagram of a data encoder.

With reference to FIG. 11, a terminal 40 (in this example a 3G mobile telephone) is in communication with a base station antenna 42. Data 44 to be transmitted to the terminal 40 is modulated by modulator 46 prior to transmission via base station antenna 42.

Following successful receipt of data by the terminal 40, the terminal issues an acknowledgement which ultimately is received by the base station controller; the so-called "radio network controller" (RNC).

It will be appreciated that the detailed steps in retrieving an ACK/NACK message from the RNC have been omitted for reasons of clarity. These are set out in the relevant 3G standards.

In general, in any modulation scheme, there is a trade off between robustness of the scheme in the presence of channel interference, and data throughput. This is at least in part because increased robustness is usually achieved by introducing redundancy during the coding and modulation steps which allow error detection and preferably correction, to be carried out by the terminal after receipt of errored data as a result of channel interference. Thus in order to optimise data throughput in the network, it is usually necessary to use the least robust modulation scheme which is consistent with accurate reception and demodulation at the terminal. This object may be achieved for example by feeding back carrier to interference (C/I) figures for the channel between the base station and the terminal. However, for mobile terminals, particularly those with high speeds, for example, on trains or in road vehicles, the C/I figures vary within the space of a few milliseconds and thus the C/I data may well be out of date before the transmission modulation scheme can be adapted. Furthermore, there is a potential bottleneck in the uplink in most networks which usually prevents frequent C/I information being returned from a large number of terminals. Thus in practice, modulation schemes are selected conservatively and on a long-term basis in order to allow a large error correction and detection margin without frequent adjustment.

With further reference to FIG. 11, a solution to this problem is proposed. By monitoring the ACK/NACK messages at the transmitter, it is possible to build up a database of such messages mapped for each terminal, against the modulation scheme used to send the data. This database 48 may then be used by a modulation controller 50 to select appropriate modulation schemes for subsequent transmissions. The mappings held in the database 48 may be used to infer information about the quality of the channel to the particular terminal without using uplink bandwidth to transmit explicit C/I information.

One possible way of using this information is to attempt to achieve a relatively constant error rate by counting the number of blocks which are received successfully without error and only decreasing the modulation robustness (and therefore increasing the data throughput) when a predetermined number of successful blocks have been received without any intervening failed blocks. Thus, if N is the number of data blocks in a continuous sequence of successfully received data portions (e.g. blocks) then this may be related to a block error rate with the formula $$N = \left(\frac{1}{E}\right) - 1$$

where E is an error rate approximation. This equation is only one example of a suitable relationship for controlling changes in modulation level in relation to implied transmission or reception errors derived from ACK/NACK messages.

Figure 12:
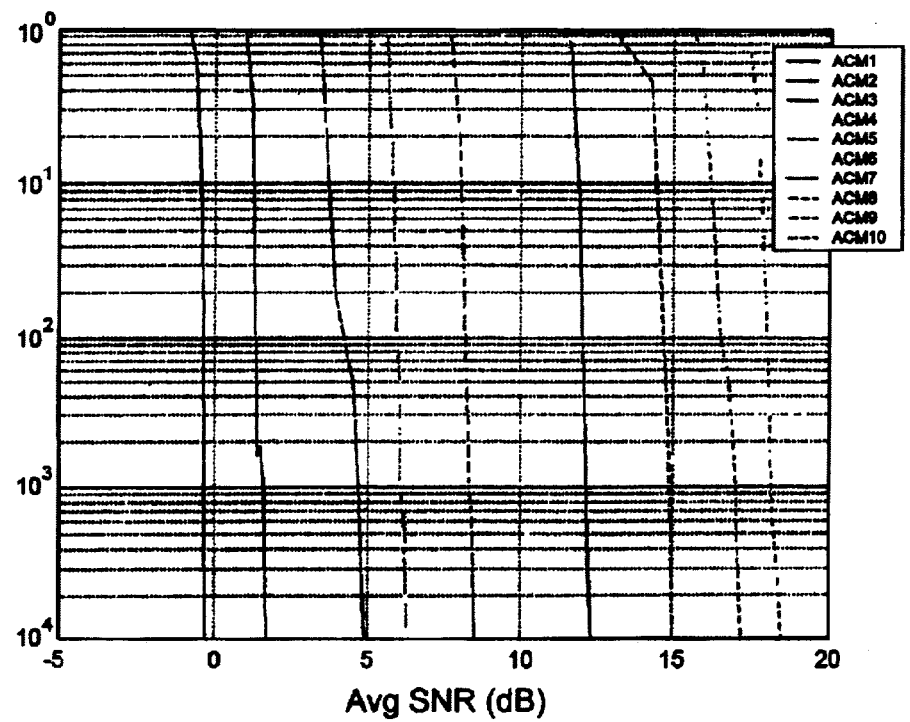
FIG. 12 is a plot of Block Error Rate (BLER) against SNR for 10 simulated modulation schemes.

With reference to FIG. 12, ten potential modulation schemes are shown (ACM1 to ACM10) which have steadily decreasing robustness to noise. The ACM1 plot (the leftmost in FIG. 12) provides a block error rate of 10 at an average signal to noise ratio (SNR) of about −1 dB. The next most robust modulation scheme (ACM2), however, provides the same error rate at a signal to noise ratio of about 2 dB. However, the ACM2 modulation scheme provides a higher data rate. In these chosen modulation schemes, ACM1 is QPSK with a coding rate of 1/3. ACM10 is 64QAM with a coding rate of 4/5. Table 1 below, shows the difference code rates and modulations used for the intervening modulation schemes.

| Modulation | Code Rate | ACM | Avg. SNR (dB) | Information Bits Rate (Mbps) | Bit Rate Mobile | Bit Rate Nomadic |
|---|---|---|---|---|---|---|
| QPSK | 1/3 | 1 | 18.5 | 3.0684 | 3.5 | 5.1 |
|  | 1/2 | 2 | 20 | 4.0912 | 4.1 | 6.1 |
|  | 2/3 | 3 | 23 | 5.6254 | 5.4 | 8.6 |
|  | 4/5 | 4 | 25 | 6.6482 | 6.4 | 9.8 |
| QAM-16 | 1/2 | 6 | 29 | 8.1824 | 7.8 | 12.6 |
|  | 4/5 | 7 | 31 | 12.785 | 12.2 | 14.0 |
| QAM-64 | 1/3 | 5 | 27 | 8.1824 | 7.9 | 11.2 |
|  | 2/3 | 8 | 33 | 15.8534 | 14.2/16.3 | 15.3/18.4 |
|  | 3/4 | 9 | 35 | 17.899 | 16.1/18.0 | 16.5/19.0 |
|  | 4/5 | 10 | 37 | 19.4332 | 17.5/19.3 | 17.4/19.3 |

Using the formula above, simulations have been carried out using the modulations and coding rates shown in the table. N was set to 70 and a counter incremented each time a block is successfully acknowledged and if a block was found in error before the value of 70 was reached by the counter then the next lowest ACM modulation scheme was used (i.e. a decrease in the data rate was made but an increase in the modulation robustness was also made. If N error-free blocks were received then the next highest modulation scheme was used i.e. ACM=ACM+1. This increased the data rate but also reduced the modulation robustness.

Using this approach, and allowing the system to reach equilibrium to find its own appropriate modulation scheme, the data rate shown in the column headed "Information Bits Rate" was achieved in the presence of the signal to noise ratios shown in the column headed "Average SNR". The figures shown in the "Information Bits Rate" column were achieved by directly reporting the average SNR to the base station. Thus these figures show the optimum solution in which uplink bandwidth is used to provide frequent C/I figures. However, the remaining two columns in the table ("Bit Rate Mobile" and "Bit Rate Nomadic") show that these optimum figures can be closely approached using the ACK/NACK scheme described above.

"The Bit Rate Mobile" column shows the data rate achieved without knowledge of the instantaneous channel quality but derived simply from looking at ACKS and NACKS received from the RNC. It is well known that such L2ARQs take a relatively long time (of the order of several milliseconds) to become available at the RNC. Thus such figures cannot be used to respond to instantaneous changes in the channel as would be expected from a highly mobile terminal. Level 1 HARQs may be derived from the radio link controller (RLC) in a 3G network much more quickly (typically on a block-by-block basis rather than frame-by-frame). Thus, by using level 1 hybrid ARQ (HARQ) acknowledgements directly from the base station (BTS), the figures in the final column (Bit Rate Nomadic) may be achieved. It will be seen that these figures improve on the Bit Rate Mobile column because the ACM level is able to track changes in the channel more rapidly and effectively in real time.

Finally, the underlined figures in the last three rows of the table are those achieved by carrying out a further iteration to adjust N in order to achieve a predetermined block error rate. Thus rather than fixing N at some value (70 in the example) which provides approximately 1% BLER, N itself may be adjusted in order directly to achieve the 1% BLER; increasing N lowers the BLER and vice versa. It will be seen that this improves matters at high average SNR because the basic algorithm shown above becomes conservative at this point and does not use as high modulation scheme as it could.

It will be appreciated that this example has been given in relation to a 3G radio network. However, the example is not limited to such a network or even to a wireless network. It will be appreciated that all that is required is the ability to offer several different modulation schemes which perform differently in the presence of noise and to provide a data hand shaking arrangement in which acknowledgements or retransmission requests are issued by the receiving terminal.

It will be noted that the ACK/NACK modulation scheme technique may be used in combination with the multi-level modulation idea used above so that different data streams may have different modulation schemes applied to them and indeed the ACK/NACK technique described above may be used to select which data streams have which modulation schemes applied to them.

As an alternative or in combination, the selection of modulation schemes may be made on the basis of whether or not data is delay sensitive. It will be appreciated that data, particularly for multi-media applications such as audio or video, must be delivered within a particular timescale. Conventionally, the delivery of data of this type may be carried out using a particularly robust modulation scheme (for example the high level QPSK modulation discussed above), in order to ensure that it arrives without requiring retransmissions which may put it beyond its expiry date. However, this has the considerable disadvantage that other terminals may be required to wait for data while this occurs even though the Eb/No or C/I figures for these terminals are high. Thus using the multi-level modulation scheme above, it is possible to schedule delay sensitive data for delivery on time whilst allowing data to be sent to other terminals simultaneously thereby maintaining data throughput in the network as a whole.

Typically, the delay sensitive data is transmitted using the high level QPSK modulation. However, if information about the channel is available, for example by virtue of an explicit C/I figure which is still up to date, or by virtue of the ACK/NACK scheme described above, then a different modulation level (typically a less robust modulation level or scheme) may be chosen. Thus these techniques may effectively and usefully be applied alternatively or in combination to provide good data throughput whilst delivering time sensitive data on time.

The embodiments described above have been described with reference to transmissions within a cellular radio network. However, it will be appreciated that these techniques may be used in other radio communications applications and in wired/cabled applications.

For example, these techniques may be used to provide cable distribution systems for combined TV and data distribution with many users sharing one cable, for providing a dedicated digital subscriber loop, such as for video to the home type applications, or for a satellite downlink data system such as for internet access.

In the wireless field, the techniques may be used in a Wireless LAN system, (potentially being incorporated into future versions of the IEEE802.11 standard), for generic wireless paging or data-push applications, for infra red data communication systems, such as indoor point-to-point data communication between PDAs and desktop computers, for Bluetooth style radio communication system for interconnection of a user's various items such as mobile phones and computers, or for traditional point to point radio communications systems.

The techniques may also be used to provide a fibre optic systems to the home arranged in star or ring configurations and generally speaking, with any system which can carry dedicated user data as well as broadcasting such as Digital Audio Broadcasting and Digital Video Broadcasting.

In addition to the modulation schemes described above, it will be appreciated that the techniques can be applied equally well to other modulations such as CDMA, OFDM (orthogonal frequency division multiplex), and Time division multiple access (TDMA) as used in some GPRS and EDGE (enhanced data rate) cellular systems due for roll-out soon.

Although it is anticipated that the QPSK modulation configuration will most commonly be used, non-Cartesian modulations, such as multiple amplitude level and phase shift keying, are also understood to be encompassed by this invention.

What is claimed is:

1. A method of transmitting data over a communication network comprising:
   (a) dividing the data into a plurality of distinct data streams,
   (b) modulating each data stream into a single transmission signal at different respective modulation levels,
   (c) transmitting the signal, and
   (d) including keeping a record of acknowledgements or retransmission requests from particular terminal for a first portion of data and subsequent portions destined for the particular terminal, and periodically revising the modulation level used for data transmissions to the particular terminal based at least on the record of acknowledgements or retransmission requests, wherein the record of acknowledgements or retransmission requests is used to produce a representation N of the number of data portions in a continuous sequence of successfully received data portions which is uninterrupted by data portions which have failed to be received and wherein the method includes considering using a lower modulation level for subsequent transmissions to the particular terminal when N has reached a predetermined threshold value;
   wherein the predetermined threshold value for N is chosen using the formula $$N - \left(\frac{1}{E}\right) - 1$$

where
   E is an error rate approximation, and
   N is the number of data portions in a continuous sequence of successfully received data portions which is uninterrupted by data portions which have failed to be received.

2. A method according to claim 1, including applying forward error correction to at least one of the data streams.

3. A method according to claim 1, wherein the modulation used is quadrature amplitude modulation.

4. A method according to claim 3, wherein each data stream is modulated using QPSK and wherein the modulated signals are combined at successively decreasing power levels to produce a composite signal for transmission over the network.

5. A method according to claim 4, wherein each successive QPSK modulation level is modulated at half the amplitude of the preceding modulation level.

6. A method according to claim 1, wherein the actual error rate of transmissions to the particular terminal is measured over time and wherein adjustments are made periodically to N to achieve a desired actual error rate.

7. A method according to claim 1, further including prioritising data for transmission dependent on its sensitivity to delay, and any impending deadline for receipt at a network terminal, and selecting the modulation level for delay sensitive data to be chosen to provide a likelihood of timely delivery greater than a predetermined threshold.

8. A method according to claim 1, including waiting for an acknowledgement of received data for each data stream and re-transmitting data which is not acknowledged within a predetermined time period.

9. A method according to claim 8, wherein the data is re-transmitted in a data stream which is modulated at the same level as the original transmission.

10. A method according to claim 8, wherein the data is re-transmitted in a data stream which is modulated at a higher modulation level than the original transmission.

11. A transmitter having:
   (a) a plurality of data inputs arranged to receive respective data streams, and
   (b) a modulator for applying modulation to a transmission signal responsive to data received at each of the data inputs,
   the modulator being arranged to apply modulation at different respective amplitude levels for data received at respective data inputs(( )), the modulation band including keeping a record of acknowledgements or retransmission requests from particular terminal for a first portion of data and subsequent portions destined for the particular terminal, and periodically revising the modulation level used for data transmissions to the particular terminal based at least on the record of acknowledgements or retransmission requests, wherein the record of acknowledgements or retransmission requests is used to produce a representation N of the number of data portions in a continuous sequence of successfully received data portions which is uninterrupted by data portions which have failed to be received and wherein the method includes considering using a lower modulation level for subsequent transmissions to the particular terminal when N has reached a predetermined threshold value;

wherein the predetermined threshold value for N is chosen using the formula $$N = \left(\frac{1}{E}\right) - 1$$

where

E is an error rate approximation, and

N is the number of data portions in a continuous sequence of successfully received data portions which is uninterrupted by data portions which have failed to be received.

12. A transmitter according to claim 11, wherein the modulator is arranged to apply the modulation dependent at least on the delay sensitivity of the data and the proximity of any impending deadline for receipt of data at a network terminal.

13. A transmitter according to claim 11, arranged to receive acknowledgements of successfully received data and to re-transmit data which has not been acknowledged in a predetermined time period.

14. A transmitter according to claim 13, further arranged to re-transmit data using a different modulation level to that used for the original transmission.

15. A method of transmitting data over a communication network to a plurality of terminals comprising:

(a) modulating a signal for transmission with a plurality of respective data streams, (b) selecting the modulation amplitude for each data stream according to the desired destination of each respective data stream, and (c) simultaneously transmitting the data streams, whereby the data is simultaneously transmitted to selected terminals by virtue of their differing radio channel properties and distances from the transmitter and the modulation amplitude is selected by using the record of acknowledgements or retransmission requests is used to produce a representation N of the number of data portions in a continuous sequence of successfully received data portions which is uninterrupted by data portions which have failed to be received and wherein the method includes considering using a lower modulation level for subsequent transmissions to the particular terminal when N has reached a predetermined threshold value;

wherein the predetermined threshold value for N is chosen using the formula $$N = \left(\frac{1}{E}\right) - 1$$

where

E is an error rate approximation, and

N is the number of data portions in a continuous sequence of successfully received data portions which is uninterrupted by data portions which have failed to be received;

including keeping a record of acknowledgements or retransmission requests from particular terminal for a first portion of data and subsequent portions destined for the particular terminal, and periodically revising the modulation level used for data transmissions to the particular terminal based at least on the record of acknowledgements or retransmission requests.

16. A method according to claim 15, wherein at least some of the data to be transmitted is delay sensitive and wherein the modulation level for delay sensitive data and the scheduling of transmission of the delay sensitive data is chosen to ensure timely receipt.

17. A method of transmitting data over a communication network to a plurality of terminals comprising:

(a) coding data at different code rates with a plurality of respective data streams, (b) modulating the coded data, and (c) simultaneously transmitting the data streams, whereby the data is simultaneously transmitted to selected terminals by virtue of their differing radio channel properties and distances from the transmitter wherein the coded data is modulated according to using the record of acknowledgements or retransmission requests to produce a representation N of the number of data portions in a continuous sequence of successfully received data portions which is uninterrupted by data portions which have failed to be received and wherein the method includes considering using a lower modulation level for subsequent transmissions to the particular terminal when N has reached a predetermined threshold value;

wherein the predetermined threshold value for N is chosen using the formula $$N = \left(\frac{1}{E}\right) - 1$$

where

E is an error rate approximation, and

N is the number of data portions in a continuous sequence of successfully received data portions which is uninterrupted by data portions which have failed to be received;

including keeping a record of acknowledgements or retransmission requests from particular terminal for a first portion of data and subsequent portions destined for the particular terminal, and periodically revising the modulation level used for data transmissions to the particular terminal based at least on the record of acknowledgements or retransmission requests.

18. A method according to claim 17, wherein the modulation amplitude for each data stream is selected according to the desired destination of each respective data stream.

19. A method according to claim 17, wherein at least some of the data to be transmitted in delay sensitive and wherein the modulation level for delay sensitive data and the scheduling of transmission of the delay sensitive data is chosen to ensure timely receipt.

20. A computer program which when executed on a suitable transmitter in a network causes the transmitter to:
  (a) divide incoming data into a plurality of distinct data streams,
  (b) modulate each data stream into a single transmission signal at different respective modulation levels, and
  (c) transmit the signal over the network and
  (d) including keeping a record of acknowledgements or retransmission requests from particular terminal for a first portion of data and subsequent portions destined for the particular terminal, and periodically revising the modulation level used for data transmissions to the particular terminal based at least on the record of acknowledgements or retransmission requests, wherein the record of acknowledgements or retransmission requests is used to produce a representation N of the number of data portions in a continuous sequence of successfully received data portions which is uninterrupted by data portions which have failed to be received and wherein the method includes considering using a lower modulation level for subsequent transmissions to the particular terminal when N has reached a predetermined threshold value;
  wherein the predetermined threshold value for N is chosen using the formula $$N = \left(\frac{1}{E}\right) - 1$$

where
   E is an error rate approximation, and
   N is the number of data portions in a continuous sequence of successfully received data portions which is uninterrupted by data portions which have failed to be received.

21. A computer program according to claim 20, further arranged to cause prioritisation of data for transmission dependent on its sensitivity to delay, and any impending deadline for receipt at a network terminal, and to cause the modulation level for delay sensitive data to be chosen to provide a likelihood of timely delivery greater than a predetermined threshold.

22. A computer program according to claim 20, the modulation level used for data transmissions to the particular terminal based at least on the record of acknowledgements or retransmission requests is periodically revised.

23. A method of transmitting data over a communications network comprising:
  (a) prioritising data for transmission according to its sensitivity to delay, and any impending deadline for receipt at a network terminal,
  (b) dividing the data into a plurality of distinct data streams,
  (c) including keeping a record of acknowledgements or retransmission requests from particular terminal for a first portion of data and subsequent portions destined for the particular terminal, and periodically revising the modulation level used for data transmissions to the particular terminal based at least on the record of acknowledgements or retransmission requests,
  (d) modulating each data stream into a single transmission signal at different respective modulation levels, and
  (e) transmitting the signal wherein the record of acknowledgements or retransmission requests is used to produce a representation N of the number of data portions in a continuous sequence of successfully received data portions which is uninterrupted by data portions which have failed to be received and wherein the method includes considering using a lower modulation level for subsequent transmissions to the particular terminal when N has reached a predetermined threshold value;
  wherein the predetermined threshold value for N is chosen using the formula $$N = \left(\frac{1}{E}\right) \cdot 1$$

where
   E is an error rate approximation, and
   N is the number of data portions in a continuous sequence of successfully received data portions which is uninterrupted by data portions which have failed to be received.

24. A method according to claim 23 wherein a network terminal provides information about the quality of the channel over which data is to be received and wherein the modulation level for delay sensitive data is chosen to ensure timely receipt based on the channel information.

25. A method according to claim 23, wherein in the absence of information about the quality of the channel over which data is to be received by a terminal, the modulation level for delay sensitive data is chosen to provide likelihood of timely delivery greater than a predetermined threshold.

26. A method according to claim 23, wherein in the absence of information about the quality of the channel over which data is to be received by a terminal, the most robust modulation level is chosen for delay sensitive data to provide the best chance of timely receipt.

27. A method according to claim 23, wherein the modulation used is quadrature amplitude modulation.

28. A method according to claim 27, wherein each data stream is modulated using QPSK and wherein the modulated signals are combined at successively decreasing power levels to produce a composite signal for transmission over the network.

29. A method of transmitting data over a network channel comprising:
  (a) providing a plurality of different modulation schemes which have differing robustness in the presence of channel interference,
  (b) selecting one of the modulation schemes for a portion of data destined for a particular network terminal,
  (c) transmitting the portion of data,
  (d) keeping a record of acknowledgements or retransmission requests from the particular terminal for the portion of data and subsequent portions destined for the particular terminal, and
  (e) periodically revising the modulation scheme used for data transmissions to the particular terminal based at least on the record of acknowledgements or retransmission requests wherein the record of acknowledgements or retransmission requests is used to produce a representation N of the number of data portions in a continuous sequence of successfully received data portions which is uninterrupted by data portions which have failed to be received and wherein the method includes considering using a less robust modulation scheme for subsequent transmissions to the particular terminal when N has reached a predetermined threshold value, and wherein the predetermined threshold value for N is chosen using the formula $$N = \left(\frac{1}{E}\right) - 1$$

where
- E is an error rate approximation, and
- N is the number of data portions in a continuous sequence of successfully received data portions which is uninterrupted by data portions which have failed to be received.

30. A method according to claim 29 wherein the actual error rate of transmissions to the particular terminal is measured over time and wherein adjustments are made periodically to N to achieve a desired actual error rate.

31. An encoder according to claim 29, wherein the different modulation schemes include QPSK modulation at different modulation levels.

32. An encoder for modulating data for transmission over a network channel comprising:
   (a) a modulator operable to modulate data using one of a plurality of different modulation schemes which have differing robustness in the presence of channel interference,
   (b) a modulation controller arranged to select one of the modulation schemes and to cause the modulator to use that modulation scheme for a portion of data destined for a particular network terminal,
   (c) an output for outputting modulated data portions for transmission,
   (d) a transmission database arranged to keep a record of acknowledgements or retransmission requests from the particular terminal for the portion of data once transmitted and for subsequent portions destined for the particular terminal,
   the modulation controller being further arranged to periodically revise the modulation scheme used for data transmissions to the particular terminal based at least on the record of acknowledgements, wherein the modulation controller is further arranged to use the record of acknowledgements or retransmission requests to produce a representation N of the number of data portions in a continuous sequence of successfully received data portions which is uninterrupted by data portions which have failed to be received and wherein the method includes considering using a less robust modulation scheme for subsequent transmissions to the particular terminal when N has reached a predetermined threshold value;
   wherein the predetermined threshold value for N is chosen using the formula $$N = \left(\frac{1}{E}\right) - 1$$

where
- E is an error rate approximation, and
- N is the number of data portions in a continuous sequence of successfully received data portions which is uninterrupted by data portions which have failed to be received.

33. An encoder according to claim 32 wherein the modulation controller is further arranged to receive a representation of the measured actual error rate of transmissions to the particular terminal and to periodically adjust N to achieve a desired actual error rate.

* * * * *